United States Patent
Gehret et al.

(10) Patent No.: US 9,511,866 B2
(45) Date of Patent: *Dec. 6, 2016

(54) STRUCTURE MOUNTED AIRBAG ASSEMBLIES AND ASSOCIATED SYSTEMS AND METHODS

(71) Applicant: AmSafe, Inc., Phoenix, AZ (US)

(72) Inventors: William J. Gehret, Chandler, AZ (US);
Joshua Vyrostek, Glendale, AZ (US);
Kevin J. Keeslar, Chandler, AZ (US);
Daniel Nick Foubert, Maricopa, AZ (US)

(73) Assignee: AmSafe, Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/384,655

(22) PCT Filed: Jan. 9, 2013

(86) PCT No.: PCT/US2013/020792
§ 371 (c)(1),
(2) Date: Sep. 11, 2014

(87) PCT Pub. No.: WO2013/141948
PCT Pub. Date: Sep. 26, 2013

(65) Prior Publication Data
US 2015/0042078 A1 Feb. 12, 2015

Related U.S. Application Data

(63) Continuation of application No. 13/424,197, filed on Mar. 19, 2012, now Pat. No. 8,523,220.

(51) Int. Cl.
*B60R 21/26* (2011.01)
*B64D 11/06* (2006.01)

(52) U.S. Cl.
CPC .............. *B64D 11/062* (2014.12); *B64D 11/06* (2013.01); *B64D 11/0604* (2014.12); *B64D 11/06205* (2014.12); *B64D 2201/00* (2013.01)

(58) Field of Classification Search
CPC .............. B64D 11/06; B64D 11/06205; B64D 11/0604; B64D 2201/00
(Continued)

(56) References Cited

U.S. PATENT DOCUMENTS

| 2,502,206 A | 3/1950 | Creek |
| 3,430,979 A | 3/1969 | Terry et al. |

(Continued)

FOREIGN PATENT DOCUMENTS

| CN | 1351710 A | 5/2002 |
| CN | 1750966 A | 3/2006 |

(Continued)

OTHER PUBLICATIONS

"Takata Melds Air Bag with Seat Belt," *The Japan Times*, Nov. 27, 2010, 1 page.

(Continued)

*Primary Examiner* — Toan To
(74) *Attorney, Agent, or Firm* — Perkins Coie LLP

(57) ABSTRACT

Structure mounted airbag assemblies and associated systems and methods are described herein. An airbag system configured in accordance with an embodiment of the present disclosure can include, for example, a housing having a cavity and an opening in communication with the cavity, an airbag assembly within the cavity, and an inflator operably coupled to the airbag assembly. The airbag assembly can include an airbag configured to deploy through the opening of the housing during a crash event. The airbag system can further include a door removably positioned across the opening and configured to move away from the opening (Continued)

US 9,511,866 B2

Page 2 during airbag deployment. The housing can be affixed to an interior portion of an aircraft, forward of and offset from an aircraft seat.

6 Claims, 11 Drawing Sheets

(58) Field of Classification Search
USPC .............................. 280/728.2, 728.3, 730.2
See application file for complete search history.

(56) References Cited

U.S. PATENT DOCUMENTS

| | | | |
|---|---|---|---|
| 3,560,027 A | | 2/1971 | Graham |
| 3,586,347 A | | 6/1971 | Carey et al. |
| 3,603,535 A | * | 9/1971 | DePolo .................. B60R 21/16 244/121 |
| 3,682,498 A | | 8/1972 | Rutzki et al. |
| 3,706,463 A | | 12/1972 | Lipkin |
| 3,730,583 A | | 5/1973 | Colovas et al. |
| 3,756,620 A | | 9/1973 | Radke |
| 3,766,612 A | | 10/1973 | Hattori |
| 3,801,156 A | | 4/1974 | Granig et al. |
| 3,820,842 A | | 6/1974 | Stephenson |
| 3,841,654 A | | 10/1974 | Lewis |
| 3,865,398 A | | 2/1975 | Woll |
| 3,866,940 A | | 2/1975 | Lewis |
| 3,888,503 A | | 6/1975 | Hamilton |
| 3,888,505 A | | 6/1975 | Shibamoto |
| 3,897,081 A | | 7/1975 | Lewis |
| 3,905,615 A | | 9/1975 | Schulman |
| 3,933,370 A | | 1/1976 | Abe et al. |
| 3,948,541 A | | 4/1976 | Schulman |
| 3,970,329 A | | 7/1976 | Lewis |
| 3,971,569 A | | 7/1976 | Abe et al. |
| 4,107,604 A | | 8/1978 | Bernier |
| 4,261,535 A | | 4/1981 | Swanson |
| 4,437,628 A | | 3/1984 | Schwartz |
| 4,536,008 A | | 8/1985 | Brown, Jr. |
| 4,565,535 A | | 1/1986 | Tassy |
| 4,611,491 A | | 9/1986 | Brown et al. |
| 4,657,516 A | | 4/1987 | Tassy |
| 4,722,573 A | | 2/1988 | Komohara et al. |
| 4,765,569 A | * | 8/1988 | Higgins .................. B60R 21/16 244/118.5 |
| 4,842,299 A | | 6/1989 | Okamura et al. |
| 4,971,354 A | | 11/1990 | Kim |
| 4,987,783 A | | 1/1991 | D'Antonio et al. |
| 4,995,638 A | | 2/1991 | Shinto et al. |
| 4,995,640 A | | 2/1991 | Saito et al. |
| 5,026,305 A | | 6/1991 | Del Guidice et al. |
| 5,062,662 A | | 11/1991 | Cameron |
| 5,062,663 A | | 11/1991 | Satoh et al. |
| 5,161,821 A | | 11/1992 | Curtis |
| 5,162,006 A | | 11/1992 | Yandle, II |
| 5,183,288 A | | 2/1993 | Inada et al. |
| 5,184,844 A | | 2/1993 | Goor |
| 5,194,755 A | | 3/1993 | Rhee et al. |
| 5,199,739 A | | 4/1993 | Fujiwara et al. |
| 5,288,104 A | | 2/1994 | Chen et al. |
| 5,299,827 A | | 4/1994 | Igawa et al. |
| 5,301,902 A | | 4/1994 | Kalberer et al. |
| 5,324,071 A | | 6/1994 | Gotomyo et al. |
| 5,335,937 A | | 8/1994 | Uphues et al. |
| 5,335,939 A | | 8/1994 | Kuriyama et al. |
| 5,344,210 A | | 9/1994 | Marwan et al. |
| 5,375,875 A | | 12/1994 | DiSalvo et al. |
| 5,400,867 A | | 3/1995 | Muller et al. |
| 5,411,289 A | | 5/1995 | Smith et al. |
| 5,447,327 A | | 9/1995 | Jarboe et al. |
| 5,454,595 A | | 10/1995 | Olson et al. |
| 5,456,491 A | | 10/1995 | Chen et al. |
| 5,465,999 A | | 11/1995 | Tanaka et al. |
| 5,470,103 A | | 11/1995 | Vaillancourt et al. |
| 5,472,231 A | | 12/1995 | France |
| 5,473,111 A | | 12/1995 | Hattori et al. |
| 5,482,230 A | | 1/1996 | Bird et al. |
| 5,485,041 A | | 1/1996 | Meister |
| 5,492,360 A | | 2/1996 | Logeman et al. |
| 5,492,361 A | | 2/1996 | Kim |
| 5,496,059 A | | 3/1996 | Bauer |
| 5,499,840 A | | 3/1996 | Nakano et al. |
| 5,556,056 A | * | 9/1996 | Kalberer .................. B64D 25/02 244/118.5 |
| 5,558,300 A | | 9/1996 | Kalberer et al. |
| 5,564,734 A | | 10/1996 | Stuckle |
| 5,597,178 A | | 1/1997 | Hardin, Jr. |
| 5,609,363 A | | 3/1997 | Finelli |
| 5,630,616 A | | 5/1997 | McPherson |
| 5,672,916 A | | 9/1997 | Mattes et al. |
| 5,727,270 A | | 3/1998 | Cope et al. |
| 5,734,318 A | | 3/1998 | Nitschke et al. |
| 5,738,368 A | | 4/1998 | Hammond et al. |
| 5,752,714 A | | 5/1998 | Pripps et al. |
| 5,758,900 A | | 6/1998 | Knoll et al. |
| 5,765,869 A | | 6/1998 | Huber |
| 5,772,238 A | | 6/1998 | Breed et al. |
| 5,802,479 A | | 9/1998 | Kithil et al. |
| 5,803,489 A | | 9/1998 | Nusshor et al. |
| 5,839,753 A | | 11/1998 | Yaniv et al. |
| 5,851,055 A | | 12/1998 | Lewis |
| 5,863,065 A | | 1/1999 | Boydston et al. |
| 5,868,421 A | | 2/1999 | Eyrainer et al. |
| 5,871,230 A | | 2/1999 | Lewis |
| 5,871,231 A | | 2/1999 | Richards et al. |
| 5,886,373 A | | 3/1999 | Hosogi et al. |
| 5,906,391 A | | 5/1999 | Weir et al. |
| 5,911,434 A | | 6/1999 | Townsend |
| 5,921,507 A | | 7/1999 | Kalberer et al. |
| 5,924,726 A | | 7/1999 | Pan et al. |
| 5,927,748 A | | 7/1999 | O'Driscoll |
| 5,927,754 A | | 7/1999 | Patzelt et al. |
| 5,947,513 A | | 9/1999 | Lehto |
| 5,975,565 A | * | 11/1999 | Cuevas .................. B60N 2/433 280/728.2 |
| 5,984,350 A | | 11/1999 | Hagan et al. |
| 5,988,438 A | | 11/1999 | Lewis et al. |
| RE36,587 E | | 2/2000 | Tanaka et al. |
| 6,019,388 A | | 2/2000 | Okazaki et al. |
| 6,042,139 A | | 3/2000 | Knox |
| RE36,661 E | | 4/2000 | Tanaka et al. |
| 6,059,312 A | | 5/2000 | Staub et al. |
| 6,065,772 A | | 5/2000 | Yamamoto et al. |
| 6,082,763 A | | 7/2000 | Kokeguchi |
| 6,113,132 A | | 9/2000 | Saslecov |
| 6,126,194 A | | 10/2000 | Yaniv et al. |
| 6,135,489 A | | 10/2000 | Bowers |
| 6,142,508 A | | 11/2000 | Lewis |
| 6,142,511 A | | 11/2000 | Lewis |
| 6,149,231 A | | 11/2000 | Wustholz |
| 6,155,595 A | | 12/2000 | Schultz |
| 6,155,598 A | | 12/2000 | Kutchey |
| 6,158,765 A | | 12/2000 | Sinnhuber |
| 6,168,195 B1 | | 1/2001 | Okazaki et al. |
| 6,173,988 B1 | | 1/2001 | Igawa |
| 6,193,269 B1 | | 2/2001 | Amamori |
| 6,199,900 B1 | | 3/2001 | Zeigler et al. |
| 6,206,411 B1 | | 3/2001 | Sunabashiri |
| 6,217,059 B1 | | 4/2001 | Brown et al. |
| 6,224,097 B1 | | 5/2001 | Lewis |
| 6,254,121 B1 | | 7/2001 | Fowler et al. |
| 6,254,130 B1 | | 7/2001 | Jayaraman et al. |
| 6,260,572 B1 | | 7/2001 | Wu |
| 6,276,714 B1 | | 8/2001 | Yoshioka |
| 6,293,582 B1 | | 9/2001 | Lewis |
| 6,325,412 B1 | | 12/2001 | Pan |
| 6,336,657 B1 | | 1/2002 | Akaba et al. |
| 6,378,896 B1 | | 4/2002 | Sakakida et al. |
| 6,378,898 B1 | | 4/2002 | Lewis et al. |
| 6,382,666 B1 | | 5/2002 | Devonport |
| 6,390,502 B1 | | 5/2002 | Ryan et al. |
| 6,398,254 B2 | | 6/2002 | David et al. |
| 6,406,058 B1 | | 6/2002 | Devonport et al. |
| 6,419,263 B1 | | 7/2002 | Busgen et al. |

(56) References Cited

U.S. PATENT DOCUMENTS

| | | |
|---|---|---|
| 6,422,512 B1 | 7/2002 | Lewis et al. |
| 6,425,601 B1 | 7/2002 | Lewis |
| 6,439,600 B1 | 8/2002 | Adkisson |
| 6,442,807 B1 | 9/2002 | Adkisson |
| 6,443,496 B2 | 9/2002 | Campau |
| 6,460,878 B2 | 10/2002 | Eckert et al. |
| 6,547,273 B2 | 4/2003 | Grace et al. |
| 6,557,887 B2 * | 5/2003 | Wohllebe ............ B60R 21/207 280/730.1 |
| 6,585,289 B1 | 7/2003 | Hammer et al. |
| 6,607,210 B2 | 8/2003 | Eckert et al. |
| 6,616,177 B2 | 9/2003 | Thomas et al. |
| 6,619,689 B2 | 9/2003 | Spencer et al. |
| 6,648,367 B2 | 11/2003 | Breed et al. |
| 6,669,229 B2 | 12/2003 | Thomas et al. |
| 6,688,642 B2 | 2/2004 | Sollars, Jr. |
| 6,705,641 B2 | 3/2004 | Schneider et al. |
| 6,729,643 B1 | 5/2004 | Bassick et al. |
| 6,739,264 B1 | 5/2004 | Hosey et al. |
| 6,746,074 B1 | 6/2004 | Kempf et al. |
| 6,749,220 B1 | 6/2004 | Wipasuramonton et al. |
| 6,758,489 B2 | 7/2004 | Xu |
| 6,764,097 B2 | 7/2004 | Kelley et al. |
| 6,769,714 B2 | 8/2004 | Hosey et al. |
| 6,776,434 B2 | 8/2004 | Ford et al. |
| 6,779,813 B2 | 8/2004 | Lincoln |
| 6,789,818 B2 | 9/2004 | Gioutsos et al. |
| 6,789,819 B1 | 9/2004 | Husby |
| 6,789,821 B2 | 9/2004 | Zink et al. |
| 6,793,243 B2 | 9/2004 | Husby |
| 6,796,578 B2 | 9/2004 | White et al. |
| 6,802,527 B2 | 10/2004 | Schmidt et al. |
| 6,802,530 B2 | 10/2004 | Wipasuramonton et al. |
| 6,808,198 B2 | 10/2004 | Schneider et al. |
| 6,823,645 B2 | 11/2004 | Ford |
| 6,824,163 B2 | 11/2004 | Sen et al. |
| 6,825,654 B2 | 11/2004 | Pettypiece, Jr. et al. |
| 6,830,263 B2 | 12/2004 | Xu et al. |
| 6,830,265 B2 | 12/2004 | Ford |
| 6,837,079 B1 | 1/2005 | Takeuchi |
| 6,838,870 B2 | 1/2005 | Pettypiece, Jr. et al. |
| 6,840,534 B2 | 1/2005 | Lincoln et al. |
| 6,840,537 B2 | 1/2005 | Xu et al. |
| 6,840,539 B2 | 1/2005 | Pettypiece, Jr. |
| 6,843,503 B2 | 1/2005 | Ford |
| 6,846,005 B2 | 1/2005 | Ford et al. |
| 6,851,374 B1 | 2/2005 | Kelley et al. |
| 6,857,657 B2 | 2/2005 | Canterberry et al. |
| 6,860,509 B2 | 3/2005 | Xu et al. |
| 6,863,301 B2 | 3/2005 | Ford et al. |
| 6,869,101 B2 | 3/2005 | White et al. |
| 6,871,872 B2 | 3/2005 | Thomas |
| 6,871,874 B2 | 3/2005 | Husby et al. |
| 6,874,812 B2 | 4/2005 | Keutz et al. |
| 6,874,814 B2 | 4/2005 | Hosey et al. |
| 6,877,771 B2 | 4/2005 | Weber |
| 6,882,914 B2 | 4/2005 | Gioutsos et al. |
| 6,886,856 B2 | 5/2005 | Canterberry et al. |
| 6,886,858 B2 | 5/2005 | Olson |
| 6,887,325 B2 | 5/2005 | Canterberry et al. |
| 6,894,483 B2 | 5/2005 | Pettypiece, Jr. et al. |
| 6,905,134 B2 | 6/2005 | Saiguchi et al. |
| 6,908,104 B2 | 6/2005 | Canterberry et al. |
| 6,923,483 B2 | 8/2005 | Curry et al. |
| 6,929,283 B2 | 8/2005 | Gioutsos et al. |
| 6,932,378 B2 | 8/2005 | Thomas |
| 6,942,244 B2 | 9/2005 | Roychoudhury |
| 6,951,350 B2 | 10/2005 | Heidorn et al. |
| 6,951,532 B2 | 10/2005 | Ford |
| 6,953,204 B2 | 10/2005 | Xu et al. |
| 6,955,377 B2 | 10/2005 | Cooper et al. |
| 6,957,828 B2 | 10/2005 | Keeslar et al. |
| 6,962,363 B2 | 11/2005 | Wang et al. |
| 6,962,364 B2 | 11/2005 | Ju et al. |
| 6,966,576 B1 | 11/2005 | Greenstein |
| 6,974,154 B2 | 12/2005 | Grossert et al. |
| 6,983,956 B2 | 1/2006 | Canterberry et al. |
| 6,994,372 B2 | 2/2006 | Ford et al. |
| 7,007,973 B2 | 3/2006 | Canterberry et al. |
| 7,021,653 B2 | 4/2006 | Burdock et al. |
| 7,029,024 B2 | 4/2006 | Baumbach |
| 7,036,844 B2 | 5/2006 | Hammer et al. |
| 7,044,500 B2 | 5/2006 | Kalandek et al. |
| 7,044,502 B2 | 5/2006 | Trevillyan et al. |
| 7,048,298 B2 | 5/2006 | Arwood et al. |
| 7,052,034 B2 | 5/2006 | Lochmann et al. |
| 7,055,856 B2 | 6/2006 | Ford et al. |
| 7,063,350 B2 | 6/2006 | Steimke et al. |
| 7,070,203 B2 | 7/2006 | Fisher et al. |
| 7,081,692 B2 | 7/2006 | Pettypiece, Jr. et al. |
| 7,090,246 B2 | 8/2006 | Lincoln et al. |
| 7,107,133 B2 | 9/2006 | Fisher et al. |
| 7,121,581 B2 | 10/2006 | Xu et al. |
| 7,121,628 B2 | 10/2006 | Lo |
| 7,131,662 B2 | 11/2006 | Fisher et al. |
| 7,131,664 B1 | 11/2006 | Pang et al. |
| 7,134,691 B2 | 11/2006 | Dunkle et al. |
| 7,147,245 B2 | 12/2006 | Florsheimer et al. |
| 7,152,880 B1 | 12/2006 | Pang et al. |
| 7,163,236 B2 | 1/2007 | Masuda et al. |
| 7,198,285 B2 | 4/2007 | Hochstein-Lenzen et al. |
| 7,198,293 B2 | 4/2007 | Olson |
| 7,213,836 B2 | 5/2007 | Coon et al. |
| 7,216,891 B2 | 5/2007 | Biglino et al. |
| 7,216,892 B2 | 5/2007 | Baumbach et al. |
| 7,222,877 B2 | 5/2007 | Wipasuramonton et al. |
| 7,255,364 B2 | 8/2007 | Bonam et al. |
| 7,261,315 B2 | 8/2007 | Hofmann et al. |
| 7,261,316 B1 | 8/2007 | Salmo et al. |
| 7,264,269 B2 | 9/2007 | Gu et al. |
| 7,267,361 B2 | 9/2007 | Hofmann et al. |
| 7,270,344 B2 | 9/2007 | Schirholz et al. |
| 7,275,763 B2 | 10/2007 | Thomas et al. |
| 7,278,656 B1 | 10/2007 | Kalandek |
| 7,281,733 B2 | 10/2007 | Pieruch et al. |
| 7,303,206 B2 | 12/2007 | Kippschull et al. |
| 7,318,599 B2 | 1/2008 | Magdun |
| 7,320,479 B2 | 1/2008 | Trevillyan et al. |
| 7,325,829 B2 | 2/2008 | Kelley et al. |
| 7,341,276 B2 | 3/2008 | Kelley et al. |
| 7,347,449 B2 | 3/2008 | Rossbach et al. |
| 7,350,806 B2 | 4/2008 | Ridolfi et al. |
| 7,354,064 B2 | 4/2008 | Block et al. |
| 7,360,791 B2 | 4/2008 | Yamada |
| 7,367,590 B2 | 5/2008 | Koning et al. |
| 7,380,817 B2 | 6/2008 | Poli et al. |
| 7,390,018 B2 | 6/2008 | Ridolfi et al. |
| 7,398,994 B2 | 7/2008 | Poli et al. |
| 7,401,805 B2 | 7/2008 | Coon et al. |
| 7,401,808 B2 | 7/2008 | Rossbach et al. |
| 7,404,572 B2 | 7/2008 | Salmo et al. |
| 7,407,183 B2 | 8/2008 | Ford et al. |
| 7,431,332 B2 | 10/2008 | Wipasuramonton et al. |
| 7,452,002 B2 | 11/2008 | Baumbach et al. |
| 7,506,891 B2 | 3/2009 | Quioc et al. |
| 7,513,524 B2 | 4/2009 | Oota et al. |
| 7,533,897 B1 | 5/2009 | Xu et al. |
| 7,557,052 B2 | 7/2009 | Konishi et al. |
| 7,594,675 B2 | 9/2009 | Bostrom et al. |
| 7,625,008 B2 | 12/2009 | Pang et al. |
| 7,648,167 B2 | 1/2010 | Bouquier et al. |
| 7,658,400 B2 | 2/2010 | Wipasuramonton et al. |
| 7,658,406 B2 | 2/2010 | Townsend et al. |
| 7,658,407 B2 | 2/2010 | Ford et al. |
| 7,658,409 B2 | 2/2010 | Ford et al. |
| 7,661,697 B2 | 2/2010 | Itoga |
| 7,665,761 B1 | 2/2010 | Green et al. |
| 7,669,897 B2 | 3/2010 | Sano |
| 7,681,917 B2 | 3/2010 | Guillo et al. |
| 7,703,796 B2 | 4/2010 | Manire et al. |
| 7,708,312 B2 | 5/2010 | Kalandek |
| 7,740,274 B2 | 6/2010 | Manssart |
| 7,753,402 B2 | 7/2010 | Volkmann et al. |
| 7,789,418 B2 | 9/2010 | Wipasuramonton et al. |

(56) References Cited

U.S. PATENT DOCUMENTS

| | | |
|---|---|---|
| 7,837,223 B2 | 11/2010 | Shilliday et al. |
| 7,883,106 B2 | 2/2011 | Mical |
| 7,976,058 B2 | 7/2011 | Suzuki et al. |
| 7,980,590 B2 | 7/2011 | Foubert et al. |
| 8,210,566 B2 | 7/2012 | Fukawatase et al. |
| 8,267,424 B2 | 9/2012 | Tomitaka et al. |
| 8,408,494 B2 | 4/2013 | Garcia Rojo |
| 8,414,018 B2 | 4/2013 | Choi et al. |
| 8,466,579 B2 | 6/2013 | Petitpierre |
| 8,523,220 B1 * | 9/2013 | Gehret ............... 244/118.5 |
| 8,528,932 B2 | 9/2013 | Islam et al. |
| 8,556,291 B2 | 10/2013 | Islam et al. |
| 8,622,417 B1 | 1/2014 | Schneider et al. |
| 8,657,334 B2 | 2/2014 | Mallinger et al. |
| 8,690,188 B2 | 4/2014 | Fiore |
| 8,727,061 B2 | 5/2014 | Rydsmo et al. |
| 8,740,244 B2 | 6/2014 | Obadia |
| 8,851,511 B1 | 10/2014 | Volkmann et al. |
| 8,882,141 B2 | 11/2014 | Arnold et al. |
| 8,894,095 B1 | 11/2014 | Meister et al. |
| 8,919,811 B2 | 12/2014 | Langer et al. |
| 8,939,465 B2 | 1/2015 | Kastelic et al. |
| 8,955,914 B2 | 2/2015 | Meister et al. |
| 2001/0028161 A1 | 10/2001 | Hoagland |
| 2001/0048215 A1 | 12/2001 | Breed et al. |
| 2002/0011723 A1 | 1/2002 | Lewis |
| 2002/0024200 A1 | 2/2002 | Eckert et al. |
| 2002/0067031 A1 | 6/2002 | Busgen et al. |
| 2002/0089152 A1 | 7/2002 | Khoudari et al. |
| 2002/0101067 A1 | 8/2002 | Breed |
| 2002/0125700 A1 | 9/2002 | Adkisson |
| 2002/0125701 A1 | 9/2002 | Devonport |
| 2002/0125705 A1 | 9/2002 | Wong et al. |
| 2002/0140209 A1 | 10/2002 | Waid et al. |
| 2003/0168837 A1 | 9/2003 | Schneider et al. |
| 2003/0178821 A1 | 9/2003 | Schneider et al. |
| 2004/0051280 A1 | 3/2004 | Anaya et al. |
| 2004/0164525 A1 | 8/2004 | Gray et al. |
| 2004/0164532 A1 | 8/2004 | Heidorn et al. |
| 2004/0178614 A1 | 9/2004 | Countryman et al. |
| 2004/0188988 A1 | 9/2004 | Wipasuramonton et al. |
| 2005/0006884 A1 | 1/2005 | Cooper et al. |
| 2005/0146119 A1 | 7/2005 | Ford et al. |
| 2005/0212270 A1 | 9/2005 | Wipasuramonton et al. |
| 2005/0218635 A1 | 10/2005 | Wipasuramonton et al. |
| 2005/0248135 A1 | 11/2005 | Poli et al. |
| 2006/0108775 A1 | 5/2006 | Schirholz et al. |
| 2006/0119084 A1 | 6/2006 | Coon et al. |
| 2006/0175816 A1 | 8/2006 | Spencer et al. |
| 2006/0186644 A1 | 8/2006 | Manire et al. |
| 2006/0220360 A1 | 10/2006 | Ridolfi et al. |
| 2006/0255569 A1 | 11/2006 | Weissert et al. |
| 2006/0255570 A1 | 11/2006 | Wipasuramonton et al. |
| 2006/0282203 A1 | 12/2006 | Hasebe et al. |
| 2007/0001435 A1 | 1/2007 | Gray et al. |
| 2007/0001437 A1 | 1/2007 | Wall et al. |
| 2007/0013175 A1 | 1/2007 | Suyama et al. |
| 2007/0075534 A1 | 4/2007 | Kelley et al. |
| 2007/0075535 A1 | 4/2007 | Trevillyan et al. |
| 2007/0075536 A1 | 4/2007 | Kelley et al. |
| 2007/0080528 A1 | 4/2007 | Itoga et al. |
| 2007/0085309 A1 | 4/2007 | Kelley et al. |
| 2007/0108753 A1 | 5/2007 | Pang et al. |
| 2007/0138775 A1 | 6/2007 | Rossbach et al. |
| 2007/0138776 A1 | 6/2007 | Rossbach et al. |
| 2007/0152428 A1 | 7/2007 | Poli et al. |
| 2007/0170717 A1 | 7/2007 | Dirassuian |
| 2007/0182137 A1 | 8/2007 | Hiroshige et al. |
| 2007/0200329 A1 | 8/2007 | Ma |
| 2007/0222189 A1 | 9/2007 | Baumbach et al. |
| 2007/0241223 A1 | 10/2007 | Boelstler et al. |
| 2007/0246922 A1 | 10/2007 | Manssart |
| 2008/0018086 A1 | 1/2008 | Ford et al. |
| 2008/0054602 A1 | 3/2008 | Yang |
| 2008/0084050 A1 | 4/2008 | Volkmann et al. |
| 2008/0088118 A1 | 4/2008 | Wipasuramonton et al. |
| 2008/0106074 A1 | 5/2008 | Ford |
| 2008/0315567 A1 | 12/2008 | Fischer et al. |
| 2009/0020032 A1 | 1/2009 | Trevillyan |
| 2009/0020197 A1 | 1/2009 | Hosey |
| 2009/0051149 A1 | 2/2009 | Kalandek et al. |
| 2009/0051150 A1 | 2/2009 | Murakami |
| 2009/0058052 A1 | 3/2009 | Ford et al. |
| 2009/0111341 A1 | 4/2009 | Rodriguez |
| 2009/0236828 A1 | 9/2009 | Foubert et al. |
| 2010/0066060 A1 | 3/2010 | Kalandek |
| 2010/0102542 A1 | 4/2010 | Nakajima et al. |
| 2010/0115737 A1 | 5/2010 | Foubert |
| 2010/0164208 A1 | 7/2010 | Kalandek |
| 2010/0276540 A1 | 11/2010 | Rojo |
| 2011/0031723 A1 | 2/2011 | Fischer et al. |
| 2011/0049850 A1 | 3/2011 | Horikawa et al. |
| 2011/0285115 A1 | 11/2011 | Putala et al. |
| 2012/0091764 A1 | 4/2012 | Cailleteau et al. |
| 2012/0256399 A1 | 10/2012 | Kokeguchi |
| 2012/0256403 A1 | 10/2012 | Shields |
| 2012/0261911 A1 | 10/2012 | Baca et al. |
| 2013/0009430 A1 | 1/2013 | Islam et al. |
| 2013/0015642 A1 | 1/2013 | Islam et al. |
| 2013/0015686 A1 | 1/2013 | Islam et al. |
| 2013/0026803 A1 * | 1/2013 | Islam ................ B60R 21/207 297/216.13 |
| 2013/0075524 A1 | 3/2013 | Islam et al. |
| 2013/0088056 A1 * | 4/2013 | Quatanens ........... B60R 21/233 297/216.13 |
| 2013/0093221 A1 | 4/2013 | Ligonniere et al. |
| 2013/0106079 A1 | 5/2013 | Jarboe et al. |
| 2013/0106080 A1 * | 5/2013 | Jarboe ................ B64D 11/0604 280/730.2 |
| 2013/0187646 A1 | 7/2013 | Baca |
| 2013/0197746 A1 | 8/2013 | Glueck et al. |
| 2013/0241180 A1 | 9/2013 | Gehret et al. |
| 2013/0307253 A1 | 11/2013 | Shin et al. |
| 2013/0307279 A1 | 11/2013 | Bernardo de Morais et al. |
| 2013/0341975 A1 | 12/2013 | Schneider et al. |
| 2014/0027574 A1 | 1/2014 | Obadia et al. |
| 2014/0077478 A1 | 3/2014 | Islam et al. |
| 2014/0159356 A1 | 6/2014 | Kastelic et al. |
| 2015/0042078 A1 | 2/2015 | Gehret et al. |
| 2015/0232184 A1 | 8/2015 | Gehret et al. |
| 2016/0001735 A1 | 1/2016 | Quatanens et al. |
| 2016/0052636 A1 | 2/2016 | Moeller et al. |
| 2016/0096627 A1 | 4/2016 | Gehret et al. |

FOREIGN PATENT DOCUMENTS

| | | |
|---|---|---|
| DE | 4019596 | 1/1992 |
| DE | 4116162 | 11/1992 |
| DE | 4218252 A1 | 12/1992 |
| DE | 4211209 | 10/1993 |
| DE | 4329275 A1 | 3/1995 |
| DE | 19742151 | 4/1998 |
| DE | 29912578 U1 | 5/2000 |
| DE | 10041042 | 5/2001 |
| EP | 0639481 | 2/1995 |
| EP | 0684168 | 5/1995 |
| EP | 0765780 | 4/1997 |
| EP | 1101660 | 5/2001 |
| EP | 2028103 | 2/2009 |
| EP | 2543556 A1 | 1/2013 |
| EP | 2546111 A1 | 1/2013 |
| EP | 2572994 A2 | 3/2013 |
| EP | 2636597 A2 | 9/2013 |
| EP | 2543557 B1 | 4/2014 |
| EP | 2596995 B1 | 9/2014 |
| FR | 2703011 | 9/1994 |
| GB | 1362672 A | 8/1974 |
| GB | 2306876 | 5/1997 |
| GB | 2368050 | 4/2002 |
| GB | 2410009 | 7/2005 |
| JP | 63258239 | 10/1988 |
| JP | 6483436 | 3/1989 |
| JP | 11189117 | 7/1999 |
| JP | 2011051413 A | 3/2011 |

(56) References Cited

FOREIGN PATENT DOCUMENTS

| JP | 2011126381 | 6/2011 |
|---|---|---|
| WO | WO-8807947 | 10/1988 |
| WO | WO-99/39940 | 8/1999 |
| WO | WO-99/42336 | 8/1999 |
| WO | WO-0100456 | 1/2001 |
| WO | WO-0168413 | 9/2001 |
| WO | 2013012890 A1 | 1/2013 |
| WO | 2013019248 A2 | 2/2013 |
| WO | 2014024046 A2 | 2/2014 |
| WO | WO-2014024046 | 2/2014 |
| WO | 2016032971 A1 | 3/2016 |
| WO | 2016041783 | 3/2016 |

OTHER PUBLICATIONS

International Search Report and Written Opinion; International Patent Application No. PCT/US2013/020792; Applicant: AmSafe, Inc.; Mailed on Jan. 29, 2013, 13 pages.
Non-Final Office Action; U.S. Appl. No. 13/424,197 Date of Mailing Jan. 10, 2013; 23 pages.
Minicooper Manual dated 2006.
Renault Espce Manual dated 2002.
Third Party Observation for European Application No. 20130763918 dated Sep. 24, 2014 (9 pages).
Federal Aviation Administration (FAA) policy statement PS-ANM-25-03, Technical Criteria for Approving Side-Facing Seats, dated Jun. 8, 2012.
Grierson et al., Simula's Line of Inflatable Restraint Technologies, TTCP Technical Report Proceedings of the Workshop: Inflatable Restraints in Aviation, May 2000, pp. 41-51.
Supplementary European Search Report dated Jan. 20, 2015; European Patent Application No. 13763918; 8 pages.

* cited by examiner

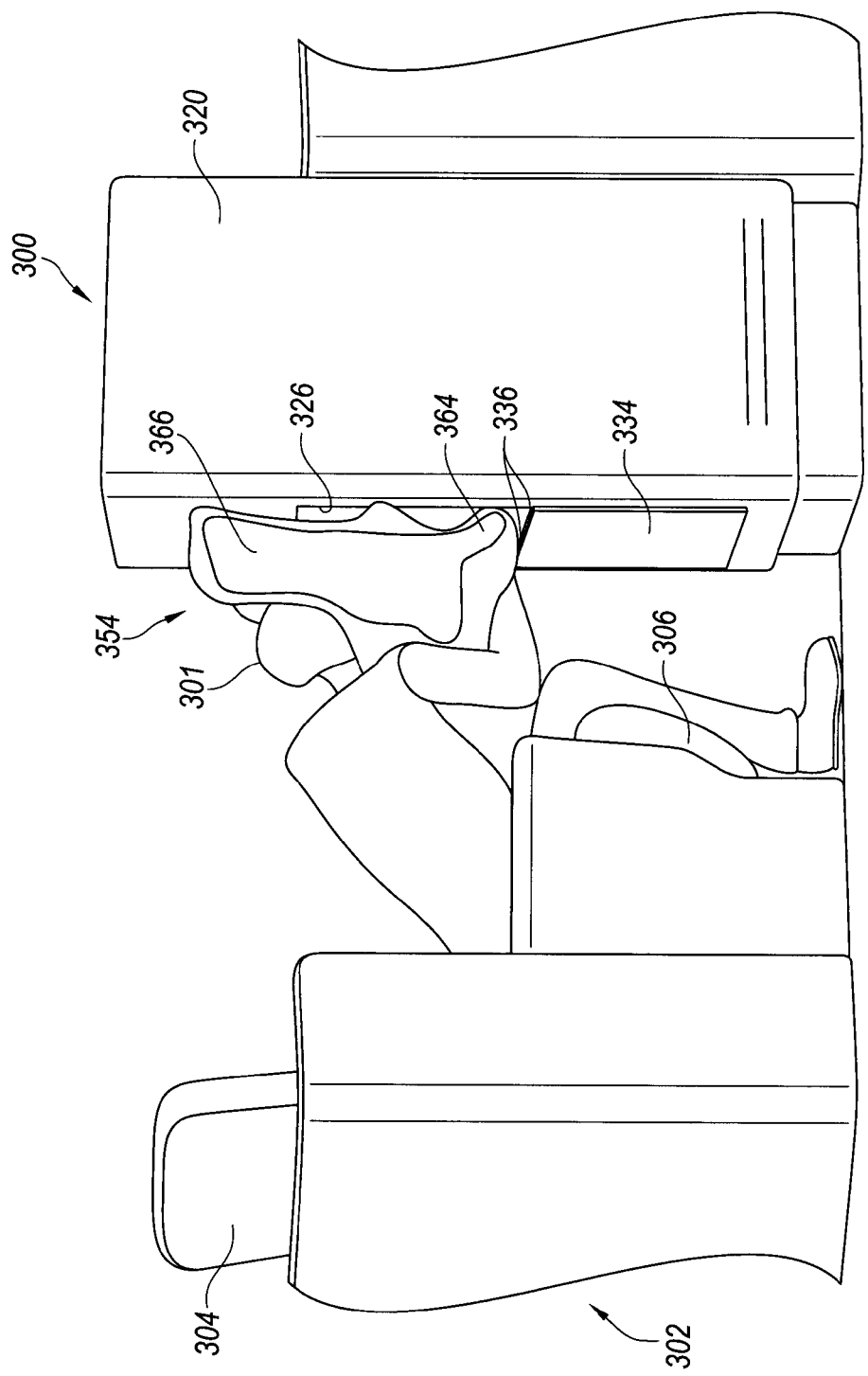

STRUCTURE MOUNTED AIRBAG ASSEMBLIES AND ASSOCIATED SYSTEMS AND METHODS

CROSS REFERENCE TO RELATED APPLICATIONS

The present application is a 35 U.S.C. §371 U.S. National Phase application of International Patent Application No. PCT/US2013/020792, filed Jan. 9, 2013, which is a continuation of U.S. patent application Ser. No. 13/424,197, filed Mar. 19, 2012, now U.S. Pat. No. 8,523,220, the disclosures of which are incorporated herein by reference in their entireties.

TECHNICAL FIELD

The following disclosure relates generally to vehicle safety systems, and more specifically to structure mounted airbag assemblies for aircraft and associated systems and methods.

BACKGROUND

Various types of seat belt and airbag systems have been used to protect passengers in automobiles, aircraft and other vehicles. In automobiles, for example, airbags typically deploy from the steering column, dashboard, side panel, and/or other fixed locations. During a rapid deceleration event (e.g., a collision), a sensor detects the event and transmits a corresponding signal to an initiation device (e.g., a pyrotechnic device) on an airbag inflator. This causes the inflator to release compressed gas into the airbag, thereby rapidly inflating the airbag.

Although airbags that deploy from stationary locations (e.g., a steering column) may be effective in automobiles, they may not be as effective in other types of vehicles having other seating arrangements. Seats in commercial passenger aircraft, for example, can be configured in a variety of layouts that provide different spacing between succeeding rows and adjacent seats. The aircraft seatbacks may also rotate forward and downward during a crash or similar event, and thus may be unsuitable for airbag storage. As a result, airbags have been developed that deploy from seat belts to accommodate occupants in aircraft and other vehicles.

BRIEF DESCRIPTION OF THE DRAWINGS

FIGS. 3A-3E are a series of views illustrating deployment of a structure mounted airbag system in accordance with an embodiment of the disclosure.

DETAILED DESCRIPTION

The present disclosure describes structure mounted air bag assemblies for use in, e.g., aircraft and associated systems and methods. In several embodiments, for example, a structure mounted airbag system in a commercial aircraft can include a housing positioned forward of and offset from a passenger seat. The housing can contain an airbag mounted behind a covered opening. During a crash or rapid deceleration event, the airbag can deploy through the opening toward the seat to reduce the impact experienced by the occupant. Since the structure mounted airbag system is offset from the vehicle seat, the airbag deploys in a manner that avoids direct contact with out-of-position seat occupants, such as occupants in the brace position (i.e., occupants with their head between their knees) and small children (e.g., children seated in a child seat or lap-held children). As used herein, the terms "structure mounted" and "structure mountable" refer to features that are or can be mounted to a substantially fixed structure (e.g., a wall, divider, or a fixed piece of furniture) rather than to a movable feature (e.g., a seat belt, a commercial aircraft seat back, etc.).

Certain details are set forth in the following description and in FIGS. 1-4C to provide a thorough understanding of various embodiments of the disclosure. For example, several embodiments of structure mounted airbag systems are described below in the context of commercial passenger aircraft. However, the structure mounted airbag systems and aspects thereof disclosed herein may be used in a wide variety of other vehicles, including other aircraft (e.g., private and military aircraft), ground vehicles (e.g., automobiles, trucks, buses, trains, and motor homes), watercraft, etc. Other details describing well-known structures and systems often associated with airbags, circuitry, restraint systems, etc., have not been set forth below to avoid unnecessarily obscuring the description of the various embodiments of the disclosure.

Many of the details, dimensions, angles and other features shown in FIGS. 1-4C are merely illustrative of particular embodiments of the disclosure. Accordingly, other embodiments can include other details, dimensions, angles and features without departing from the spirit or scope of the present invention. In addition, those of ordinary skill in the art will appreciate that further embodiments of the structure mounted airbag systems can be practiced without several of the details described below.

In the Figures, identical reference numbers identify identical or at least generally similar elements. To facilitate the discussion of any particular element, the most significant digit or digits of any reference number refers to the Figure in which that element is first introduced. For example, element 110 is first introduced and discussed with reference to FIG. 1.

Figure 1:
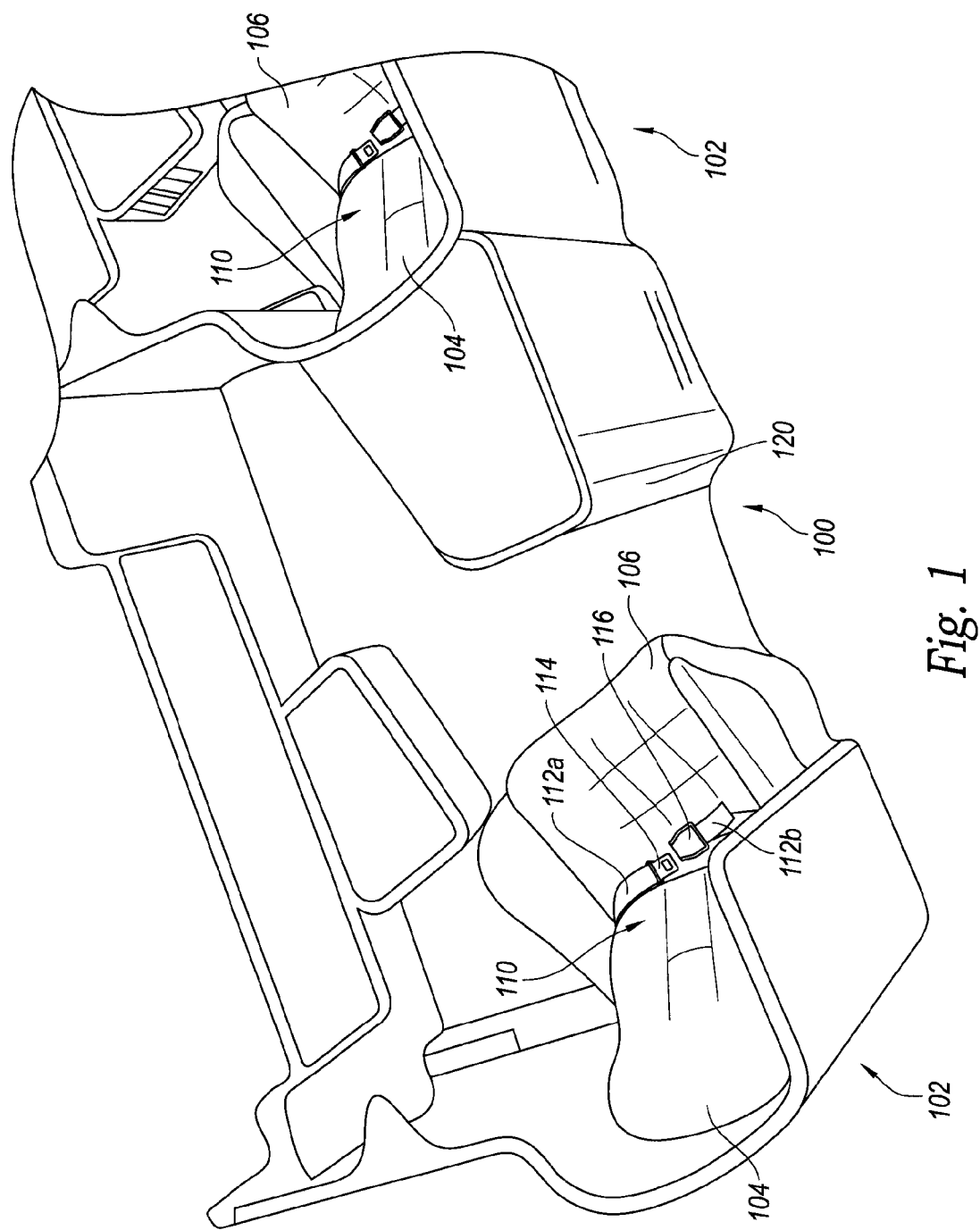
FIG. 1 is a top isometric view of a seating area in a vehicle having a seat provided with an airbag housing and related systems configured in accordance with an embodiment of the disclosure.

FIG. 1 is a top isometric view of a seating area in an aircraft having one or more seats 102 provided with a structure mounted airbag system 100 ("airbag system 100") configured in accordance with an embodiment of the disclosure. In one aspect of the illustrated embodiment, the seats 102 can be at least generally similar to conventional seats in, for example, a first or business class cabin of a commercial passenger aircraft. Accordingly, each seat 102 can include a back portion 104 extending upwardly from a seat portion 106 fixedly mounted to the floor of the aircraft. The seats 102 can each include a two-point restraint or seat belt 110 (e.g., a lap belt) having a first web portion 112a and a corresponding second web portion 112b. A proximal end portion of the first web portion 112a can be fixedly attached to the seat mounting structure on one side of the seat 102 by means of a hook or other suitable device known in the art, and the proximal end portion of the second web portion 112b can be similarly attached to the seat mounting structure on the opposite side of the seat 102. The distal end portion of the first web portion 112a can carry a connector 114 having a tongue portion, and the distal end portion of the second web portion 112b can carry a corresponding buckle 116 configured to receive and releasably engage the tongue portion of the connector 114 to couple the two web portions 112a, 112b together around a seat occupant in a conventional manner.

In one aspect of the illustrated embodiment, the airbag system 100 includes an enclosure or housing 120 fixedly attached to the floor of the vehicle forward of the seat 102 and offset to one side of the seat 102. The housing 120 can be positioned to the outside of the seat 102 proximate to the aisle of the aircraft and apart from the window and/or other inwardly positioned structure (e.g., a divider wall) as shown in FIG. 1. In other embodiments, the housing 120 can be positioned proximate to the window, between individual seats 102 in a row, and/or otherwise positioned forward of the seat 102. As described in greater detail below, an airbag (not shown) can be stored in the housing 120 and deployed through an opening in the housing 120 toward the seat 102 during a rapid deceleration or other crash event to lessen the crash impact experienced by the seat occupant. The airbag system 100 can protect the passenger's head during forward rotation about the two-point seat belt 110, and the offset positioning of the housing 120 can also provide sufficient space around the seat 102 for the passenger to move to a brace position (i.e., with the passenger's head between his or her knees) and avoid impacting the airbag as it deploys. Additionally, the housing 120 can serve to hide the airbag from view of the seat occupant to provide an aesthetically pleasing seating environment.

Figure 2A:
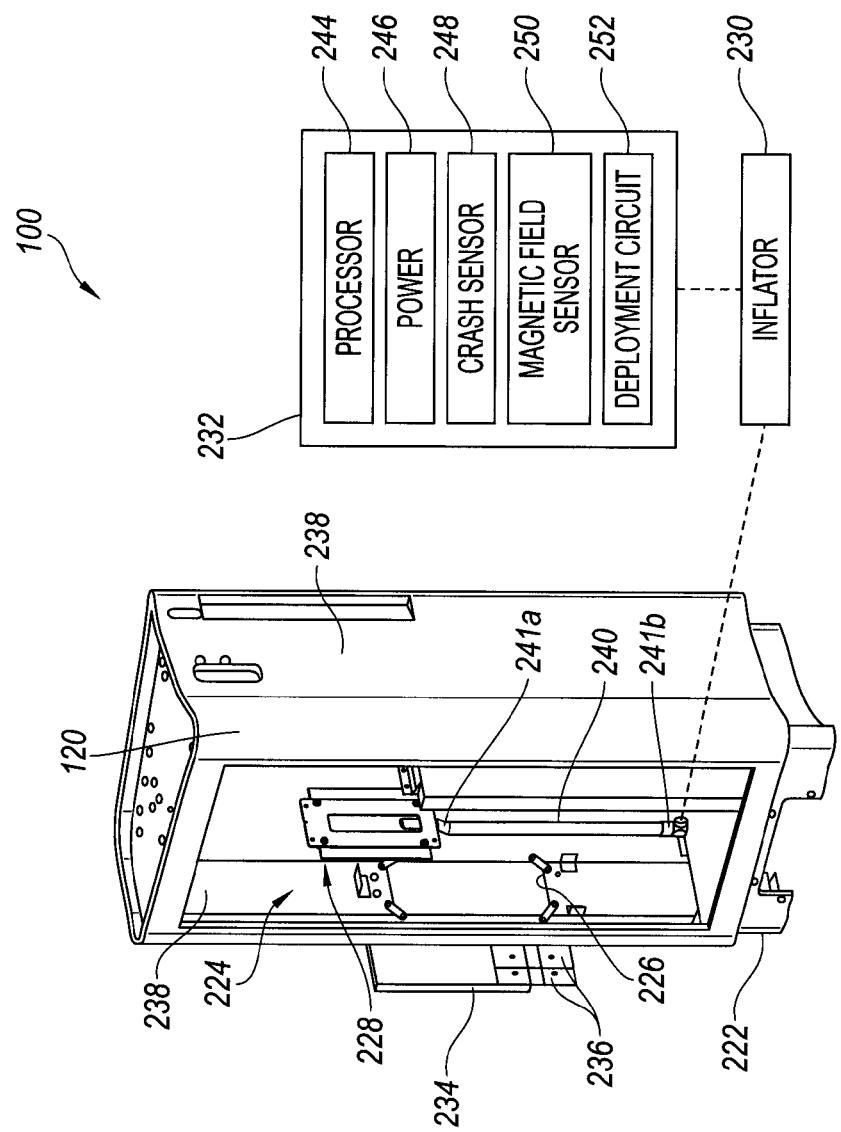
FIG. 2A is a partially schematic isometric view of an interior portion of a structure mounted airbag system configured in accordance with an embodiment of the disclosure.

FIG. 2A is a partially schematic isometric view of an interior portion of the airbag housing 120 of FIG. 1 configured in accordance with an embodiment of the disclosure. In the illustrated embodiment, the housing 120 includes a plurality of sidewalls 238 extending upwardly from a mounting structure 222 to form a cavity 224 (one sidewall 238 is removed to show the interior of the housing 120). At least one of the sidewalls 238 (e.g., the sidewall 238 facing the corresponding aircraft seat) can include an aperture or opening 226 in communication with the internal cavity 224. A structure mounted airbag assembly 228 ("airbag assembly 228") is positioned in the cavity 224 in line with the opening 226 such that the corresponding airbag (not shown) can deploy through the opening 226 during airbag inflation. For clarity, the airbag assembly 228 is shown spaced behind the opening 226, but the airbag assembly 228 can be mounted directly adjacent the opening 226 and against the corresponding sidewall 238 via screws, mounting plates, and/or other suitable attachment features. In other embodiments, the airbag assembly 228 can be positioned in other suitable locations within the cavity 224 that allow the airbag to deploy through the opening 226 or a different opening in another suitable location.

The housing 120 can be a separate or independent structural assembly that can be fixedly attached to a portion of the aircraft interior via the mounting structure 222 and inhibit passengers from accessing the airbag assembly 228 and/or associated components stored within the housing 120 (e.g., to inhibit inadvertent airbag deployment). The housing 120 can be made from a durable composite material and/or other suitable materials for storing the components of the airbag system 100 (e.g., the airbag assembly 228) to reduce the likelihood of unintentional airbag deployment (e.g., due to passenger wear and tear on the housing 120). In certain embodiments, the housing 120 can also serve as a partial divider between aircraft seats 102 (FIG. 1) and/or a table for seat occupants. A portion of the cavity 224 can also be used as storage for the seat occupant's belongings, for additional safety equipment (e.g., life vests), and/or for other items. In other embodiments, the housing 120 can be attached to or integrally formed with a portion of the aircraft (e.g., the interior sidewalls of the aircraft). The housing 120, for example, can be incorporated into a sidewall of the aircraft from which the airbag 228 can deploy.

In the illustrated embodiment, the housing 120 includes a cover or door 234 positioned across the opening 226 that at least substantially conceals the cavity 224 from view before airbag deployment. In FIG. 2A, the door 234 is shown spaced apart from the opening 226 for clarity. The door 234 can be attached to the housing 120 using one or more releasable fasteners that swing or otherwise enable the door 234 to move away from the opening 226 under the force of the inflating airbag, thereby allowing the airbag to deploy through the opening 226. The door 234, for example, can be secured over the opening 226 with a plurality of screws that are configured to break under the force of airbag deployment. In other embodiments, the door 234 can be configured to automatically move away from the opening 226 in response to a crash event rather than relying on the force of the airbag. The door 234, for example, can include electronics to automatically slide, pivot, and/or otherwise move away from the opening 226 in anticipation of airbag deployment.

In various embodiments, one or more lanyards 236 made from webbing material used for seat belts and/or other suitable materials can be attached between the door 234 and the housing 120. The lanyards 236 retain the door 234 to the housing 120 when the airbag projects through the opening 226 and prevent the door 234 from flying through the aircraft cabin. In certain embodiments, the lanyards 236 can be configured to enable the door 234 to rotate or otherwise move to an open position that is substantially flush with the adjacent sidewall 238 of the housing 120 and out of the way of the seat occupant during egress. In other embodiments, hinges and/or other suitable movable coupling mechanisms can be used to retain the door 234 to the housing 120 during and after airbag deployment.

Figure 2C:
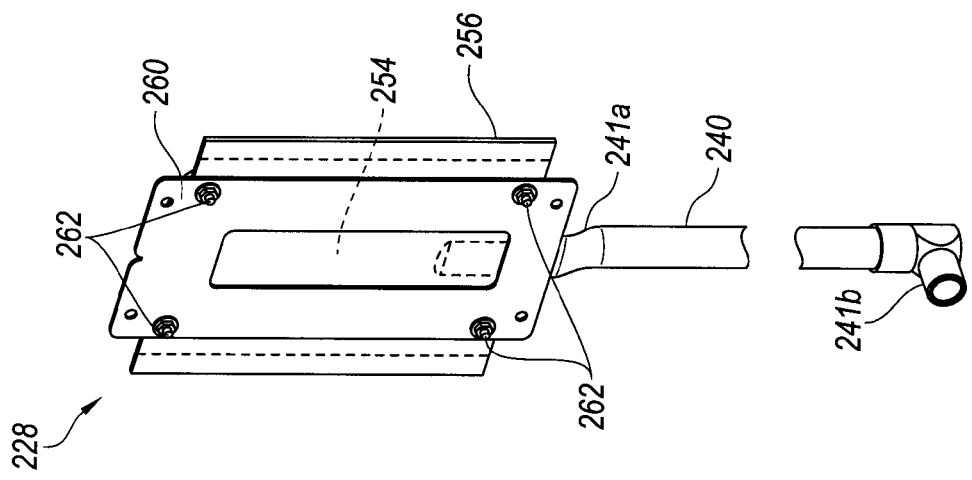
FIGS. 2B and 2C are enlarged front and back isometric views, respectively, of a structure mountable airbag assembly configured in accordance with an embodiment of the disclosure.
Figure 2B:
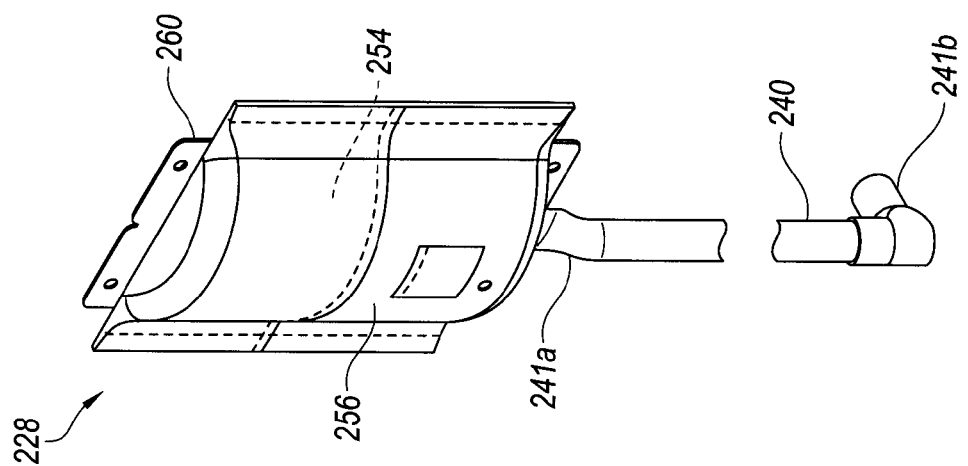
Figure 2D:
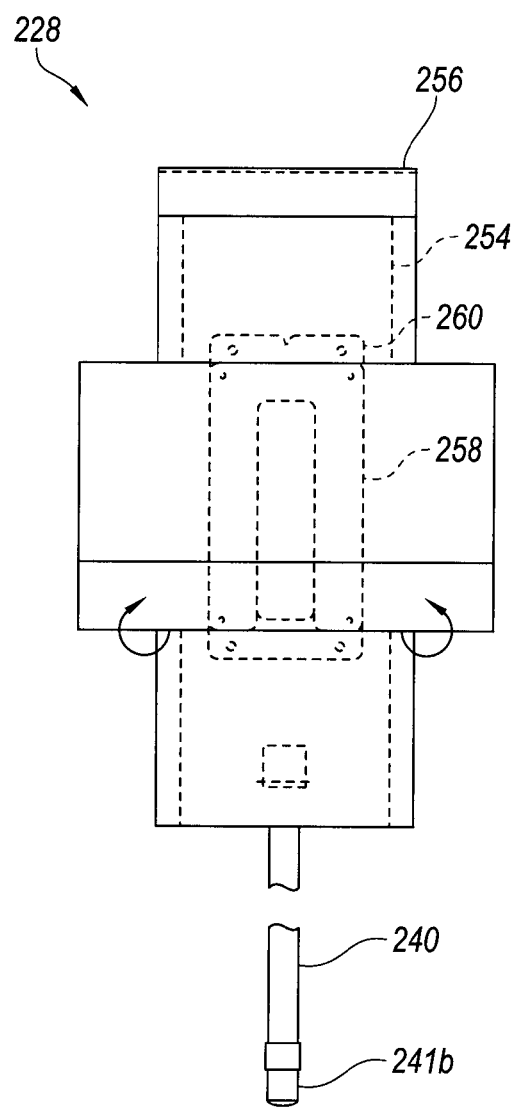
FIG. 2D is front view of the structure mountable airbag assembly of FIGS. 2B and 2C during an intermediate assembly stage in accordance with an embodiment of the disclosure.

The airbag assembly 228 can include various features that allow it to be preassembled before mounting it in the housing 120. FIGS. 2B and 2C, for example, are enlarged front and back isometric views, respectively, of the airbag assembly 228 configured in accordance with an embodiment of the disclosure, and FIG. 2D is front view of the airbag assembly 228 during an intermediate assembly stage. As shown in FIGS. 2B and 2C, the airbag assembly 228 can include an airbag 254 folded or otherwise stowed within an airbag container or cover 256. The cover 256 can be made from a flexible material, such as a thin film material made from nylon or polyamide, and can include one or more tear seams (not shown) that are designed to rupture upon airbag inflation. In other embodiments, at least a portion of the cover 256 can be made from a semi-rigid and/or rigid material that ruptures and/or otherwise releases the airbag 254 during inflation.

The airbag assembly 228 can be secured to the housing 120 (FIG. 2A) with a dual-plate mounting structure. The mounting structure can include an internal mounting plate 258 (e.g., a U-shaped mounting plate as shown in FIG. 2D) positioned inside the airbag 254 and affixed to an external mounting plate 260 (FIG. 2C) via a plurality of fasteners (e.g., screws 262). This configuration enables the peripheral portions of the external mounting plate 260 to be secured across the opening 226 of the housing 120. This dual-plate mounting structure allows the airbag assembly 228 to be preassembled before mounting to a suitable housing (e.g., the housing 120 shown in FIG. 1). FIGS. 2B-2D illustrate a certain embodiment of such a dual plate mounting structure. As those skilled in the art will understand, however, the dual-plate mounting structure as well as other suitable mounting structures can have a variety of different configurations to accommodate the structural features to which they are attached.

In various embodiments of the airbag assembly 228, the airbag 254 can include an active vent (not shown) that opens when the pressure within the airbag 254 reaches a predetermined threshold. The vent, for example, can be a discrete seam on the airbag 254 that is sewn shut and tears open at a designated pressure (e.g., when the occupant contacts the airbag 228). This feature can be of particular use with two-point restraints that do not restrain forward movement of the occupant's upper body because it limits the force with which the seat occupant impacts the airbag and reduces the rebound of the occupant from the airbag 254. The vent can also allow the airbag 254 to deflate rapidly (e.g., within seconds) after inflation so it does not impede occupant egress from the seat in an emergency situation.

Referring back to FIG. 2A, the airbag system 100 can further include an airbag inflator 230 (shown schematically) in fluid communication with the airbag assembly 228, and an electronics module assembly 232 (shown schematically) operably coupled to the inflator 230. The inflator 230 can include a container of compressed gas (e.g., air) and a pyrotechnic device (e.g., a squib connector) that can be activated by a signal sent by the electronics module assembly 232 in response to a crash event. The signal initiates the squib, which causes the container to release the expanding gas into the airbag. In other embodiments, the inflator 230 can include other suitable initiation and/or inflation devices (e.g., gas-generating inflators) well known in the art.

In various embodiments, the inflator 230 can be spaced apart from the airbag assembly 228 and fluidly coupled thereto using a gas delivery hose 240 and/or other suitable fluid passageway. The gas delivery hose 240 can include a first end fitting 241a in fluid communication with the interior of the airbag and a second end fitting 241b (e.g., an inflator connector as disclosed in U.S. patent application Ser. No. 13/194,411, which is herein incorporated by reference in its entirety) threadably or otherwise engaged with an outlet of the inflator 230. The gas delivery hose 240 can have suitable dimensions for rapid gas delivery to the airbag depending at least in part on the distance between the inflator 230 and the airbag assembly 228. In certain embodiments, for example, the gas delivery hose 240 may have a deflated width of 1.125 inches (28.58 mm) and an inflated outer diameter of 0.75 inch (19.05 mm).

In some embodiments, the inflator 230 can be positioned outside the housing 120 and/or spaced apart from the airbag assembly 228 in the cavity 224, and the gas delivery hose 240 can extend between the airbag assembly 228 and the inflator 230. The remotely positioned inflator 230, for example, can be mounted in any suitable orientation and secured to a portion of the aircraft (e.g., under the housing 120, under the floor of the aircraft proximate the housing 120, etc.) using brackets and/or other suitable mounting structures that can withstand loads encountered during normal aircraft operation, gas deployment from the inflator 230, and certain impact loads (e.g., loads applied under a 16 g dynamic test). The gas delivery hose 240 can be made from a suitable flexible material that can accommodate the positioning of the inflator 230 relative to the airbag assembly 228 and yet be durable enough to withstand the delivery of the expanding gas to the airbag and regular wear. The modular positioning of the inflator 230 with respect to the airbag assembly 228 provided by the gas delivery hose 240 allows the airbag system 100 to accommodate the space constraints of the housing 120 and the vehicle itself. In further embodiments, the gas delivery hose 240 can be omitted, and the outlet of the inflator 230 can be positioned in direct fluid communication with the airbag assembly 228.

In the illustrated embodiment, the electronics module assembly 232 includes a processor 244 that receives electrical power from a power source 246 (e.g., one or more lithium batteries), a deployment circuit 252 that initiates the inflator 230, and at least one crash sensor 248 that detects rapid decelerations and/or other crash events. The crash sensor 248, for example, can include a spring-mass-damper type sensor with an inertial switch calibrated for the vehicle's operating environments that initiates airbag deployment upon a predetermined deceleration level. In other embodiments, the crash sensor 248 can include other suitable types of sensors known in the art. Optionally, the electronics module assembly 232 can also include one or more magnetic field sensors 250 that detect the presence of an external magnetic field (e.g., from a speaker) and communicate with the processor 244 to deactivate the crash sensor 248 and prevent inadvertent deployment of the airbag assembly 228. The magnetic field sensor 250 can include, for example, the circuitry disclosed in U.S. Pat. No. 6,535,115, entitled "AIR BAG HAVING EXCESSIVE EXTERNAL MAGNETIC FIELD PROTECTION CIRCUITRY," which is herein incorporated by reference in its entirety. In other embodiments, the electronics module assembly 232 can include other sensors and/or additional features to aid in airbag deployment, and/or some of the components of the electronics module assembly 232 may be omitted. In certain embodiments, for example, the electronics module assembly 232 can include only the power source 246 and the crash sensor 248, which completes a circuit to activate the inflator 230 during a crash event. The components of the electronics module assembly 232 can be housed in a protective cover (e.g., a machined or injection-molded plastic box) that can reduce the likelihood of damaging the electronics module assembly 232 and a magnetic shield that can prevent the electronics module assembly 232 from inadvertently deploying the airbag assembly 228. In other embodiments, the electronics module assembly 232 can be stored in the housing disclosed in U.S. Provisional Patent Application No. 61/533,105, entitled "ELECTRONICS MODULE ASSEMBLY FOR INFLATABLE PERSONAL RESTRAINT SYSTEM AND ASSOCIATED METHODS," which is herein incorporated by reference in its entirety, and/or other suitable electronics housings known in the art. In further embodiments, the electronics module assembly 232 can include diagnostic testing features, such as those described in U.S. patent application Ser. No. 13/174,659, entitled "INFLATABLE PERSONAL RESTRAINT SYSTEMS" and U.S. patent application Ser. No. 13/228,333, entitled "COMPUTER SYSTEM FOR REMOTE TESTING OF INFLATABLE PERSONAL RESTRAINT SYSTEMS," which are herein incorporated by reference in their entireties.

Similar to the modular positioning of the inflator 230, the electronics module assembly 232 can also be housed within the cavity 224 or in a remote location proximate the housing 120 and coupled to the inflator 230 via suitable electrical connectors. The electronics module assembly 232, for example, can be positioned on the underside of the housing 120, under a seat, or elsewhere in the aircraft. When mounted remotely, the electronics module assembly 232 can be positioned to properly transmit the crash pulse and reduce vibration effects.

During a crash event above a predetermined threshold, the crash sensor 248 of the electronics module assembly 232 can close one or more switches, thereby causing the processor 244 to send a corresponding signal to the deployment circuit 252. Upon receiving a signal from the processor 244, the deployment circuit 252 can apply a sufficient voltage to an igniter (e.g., a squib) that causes the inflator 230 to discharge its compressed gas into the airbag 254 via the gas delivery hose 240. The expansion of the compressed gas inflates the airbag 254 (FIGS. 2B-2D) and causes it to deploy through the opening 226 in the housing 120. The door 234 moves away from the opening 226 (e.g., due to the force applied by the inflating airbag 254), allowing the airbag 254 to expand toward the occupant in the corresponding seat. The lanyards 236 can retain the opened door 234 substantially flush to the housing 120 such that it does not interfere with the occupant during subsequent egress. The airbag 254 can be offset from the seat so that it deploys in a direction that avoids direct contact with the seat occupant if the occupant is in the brace position. The airbag 254 is also positioned forward enough from the seat and sized appropriately to avoid contact with lap-held children or children in child seats. The active vent on the airbag 254 can reduce the force on the occupant at impact with the airbag 254 (e.g., a head impact criterion under 1,000), reduce rebound of the occupant's head from the airbag 254, and can also allow the airbag 254 to deflate quickly after impact (e.g., within 10 seconds) to further facilitate egress from the seat. Additionally, the modular airbag system 100 (e.g., the self-contained airbag assembly 228, inflator 230 and the electronics module assembly 232) can accommodate the space constraints of differing structural mounting locations and can be independent of other aircraft systems (e.g., without needing to be interfaced with the aircraft wiring).

Figure 3A:
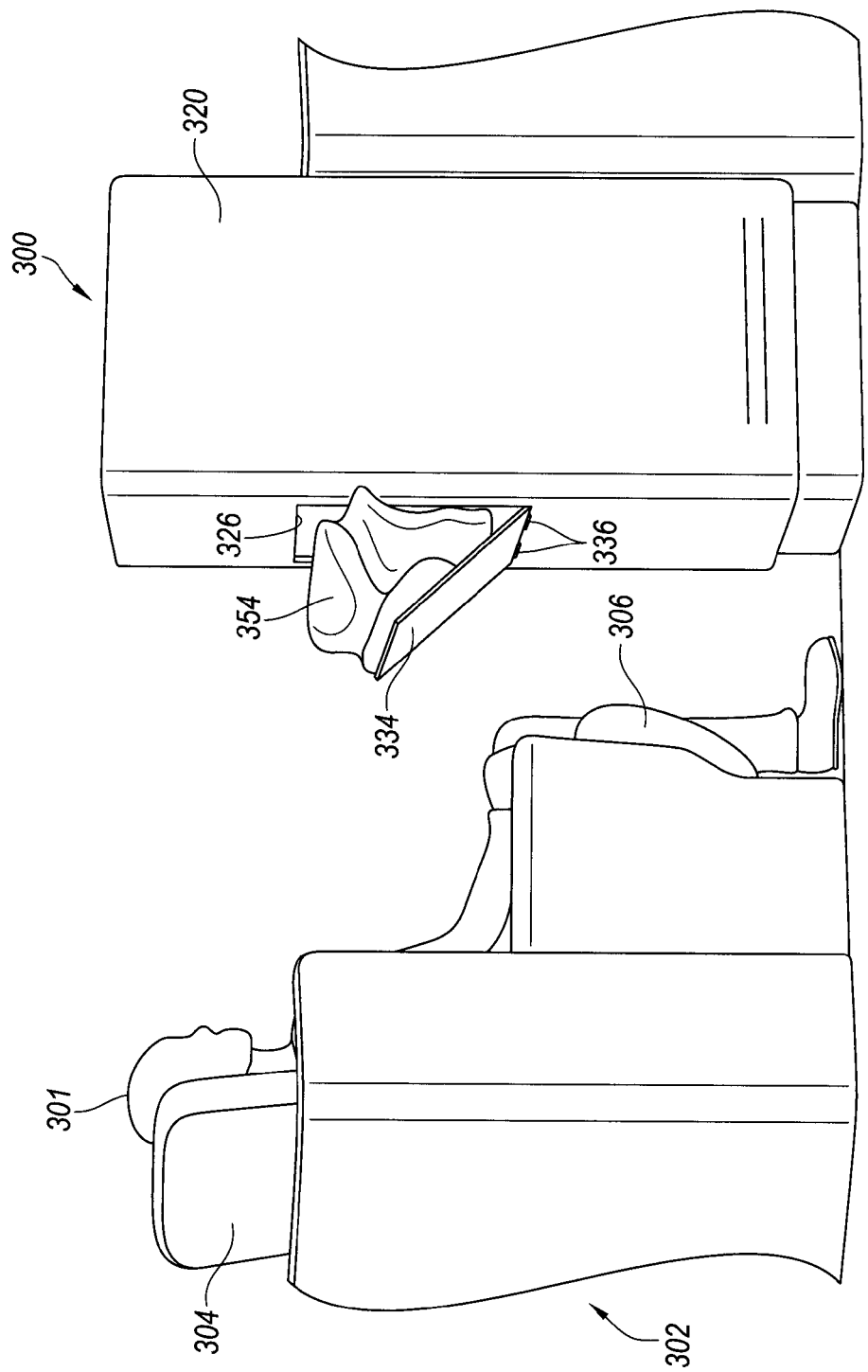

FIGS. 3A-3E are a series of isometric views illustrating deployment of a structure mounted airbag system 300 configured in accordance with an embodiment of the disclosure. The structure mounted airbag system 300 can include features generally similar in structure and function to the features of the structure mounted airbag system 100 described above with reference to FIGS. 1-2D. The structure mounted airbag system 300 can include, for example, a structurally mounted airbag assembly (not shown) positioned in a housing 320 positioned in front of and offset from an aircraft seat 302. Referring to FIG. 3A, upon detection of a crash event (e.g., by a crash sensor operably coupled to the airbag assembly in the housing 320), an airbag 354 inflates and through an opening 326 in the housing 320 toward a seat occupant 301, thereby moving a door 334 away from the opening 326. One or more hinges 336, lanyards, and/or other suitable features can be secured to the lower portion of the door 334 to retain the door 334 to the housing 320 and prevent it from launching toward the seat occupant 301.

Figure 3B:
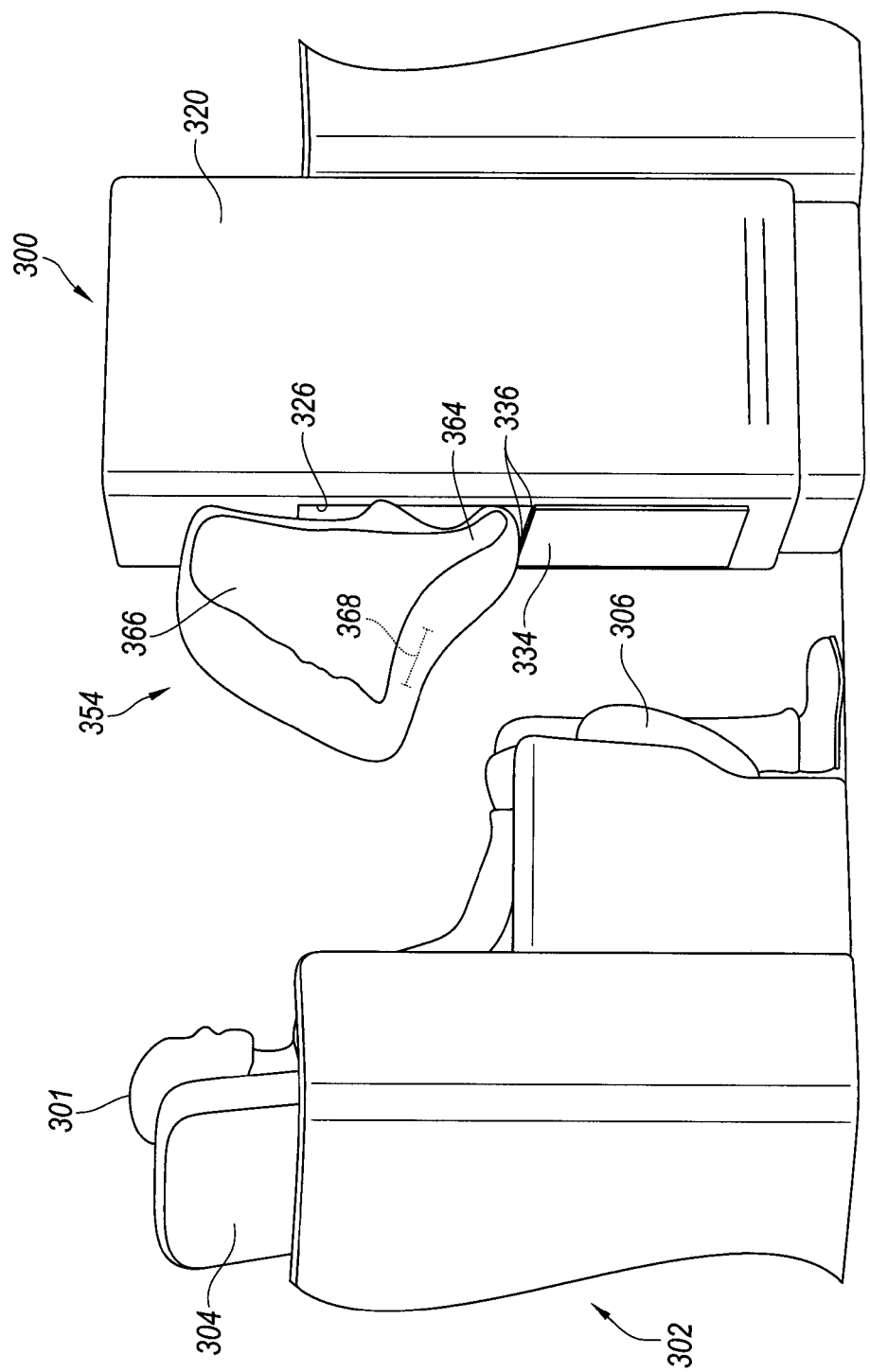

Referring to FIG. 3B, the inflation of the airbag 354 can rotate the door 334 downward against the housing 320, and thereby move it out of the way of the seat occupant 301 to facilitate subsequent egress (e.g., after a crash). In the illustrated embodiment, the airbag 354 includes a first portion 364 extending in a generally vertical direction adjacent to the housing 320 and having a substantially tubular shape, and a second portion 366 that extends generally laterally with respect to the first portion 364 toward the seat occupant 301 giving the airbag 354 a generally L-shaped cross-section. The second portion 366 can have a generally triangular cross-sectional shape that impedes the forward acceleration of the seat occupant's upper torso before the airbag 354 makes contact with the seat occupant's head, and therefore decreases the force with which the seat occupant's head strikes the airbag 354. In further embodiments, the airbag 354 can have other suitable configurations to accommodate the seat configuration, such as the airbags described below with references to FIGS. 4A-4C.

The airbag 354 can include an active vent 368 that remains closed until the internal pressure of the airbag 354 reaches a predetermined threshold, such as when the seat occupant's head impacts the airbag 354 and/or when the airbag 354 is fully inflated. In the illustrated embodiment, the vent 368 is an elongated seam at the underside of the second portion 366 of the airbag 354 that tears or otherwise ruptures at the threshold pressure to release the gas (e.g., air) from within the airbag 354. In other embodiments, the vent 368 can be positioned elsewhere on the airbag 354 and/or have other suitable configurations (e.g., a valve or plug), or it can be omitted.

Figure 3C:
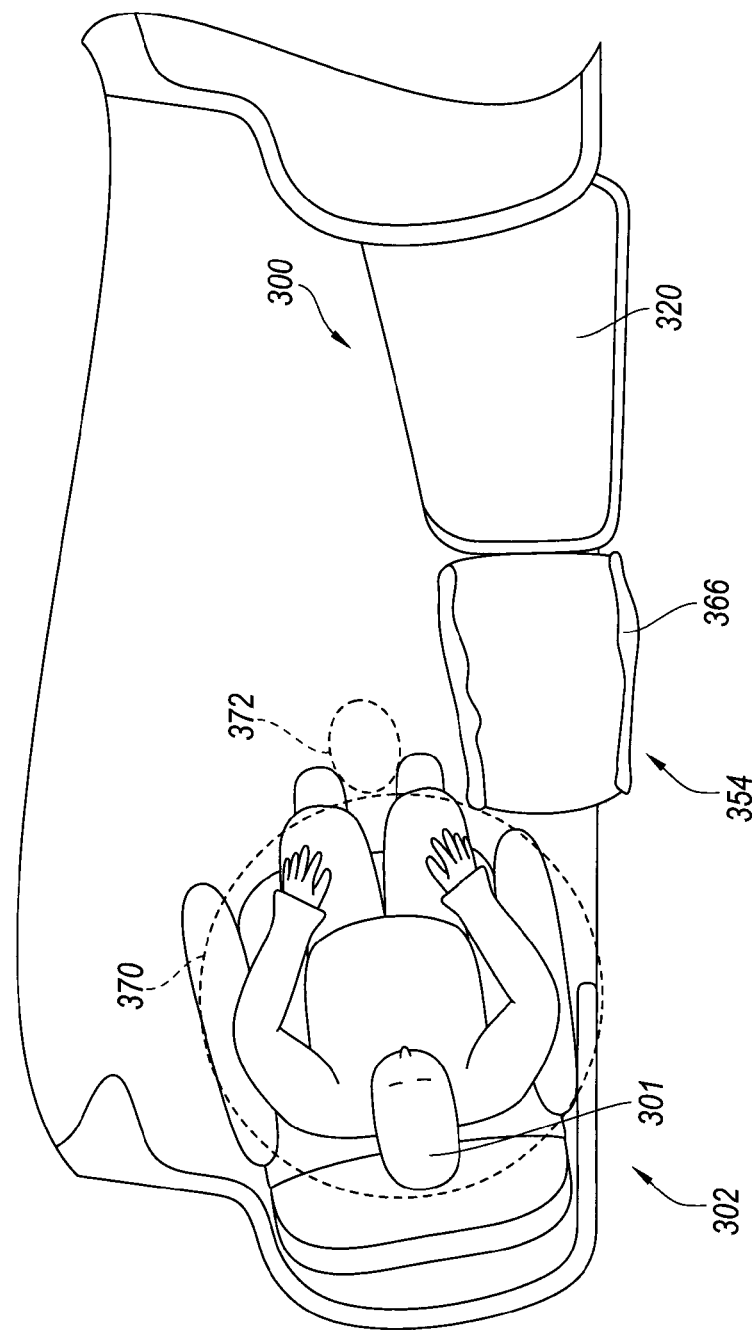

FIG. 3C is a top view of the seating arrangement of FIG. 3B illustrating that the structure mounted airbag system 300 provides a first area or zone 370 and a second area or zone 372 spaced apart from the inflated airbag 354. The first zone 370 is located at the seat 302 to provide sufficient space between the inflated airbag 354 and the seat 302 to prevent direct airbag deployment directly into a child (not shown) sitting in the seat 302, in the lap of the seat occupant 301, and/or in a child seat secured to the seat 302. The second zone 372 is spaced in front of the seat 302 to avoid airbag deployment directly into the seat occupant's head when he or she is in a brace position. As the foregoing illustrates, the structure mounted airbag system 300 can accommodate a wide range of occupant sizes and positions.

Figure 3E:
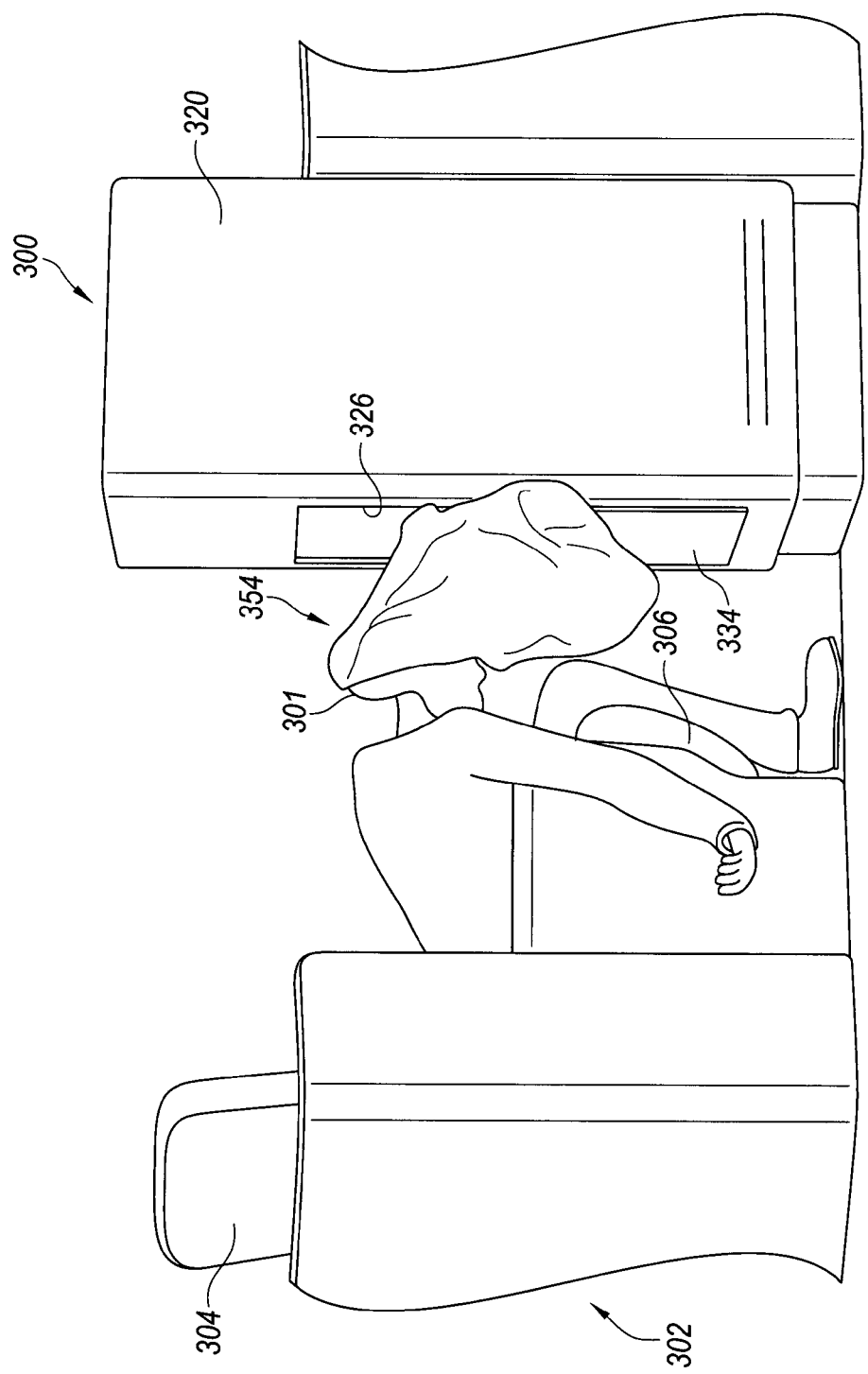

FIG. 3D illustrates the structure mounted airbag system 300 after the seat occupant 301 impacts the airbag 354. The load experienced by the occupant's upper body is distributed across the expanded airbag 354 to mitigate injury. In various embodiments, the impact of the seat occupant 301 against the airbag 354 can activate the vent 368 (FIG. 3B) to rapidly decrease the pressure within the airbag 354 and further reduce the impact experienced by the seat occupant 301. As shown in FIG. 3E, the vent 368 can also serve to quickly deflate the airbag 354 to provide a substantially clear passageway for the seat occupant 301 to move away from the seat 302.

Figure 4A:
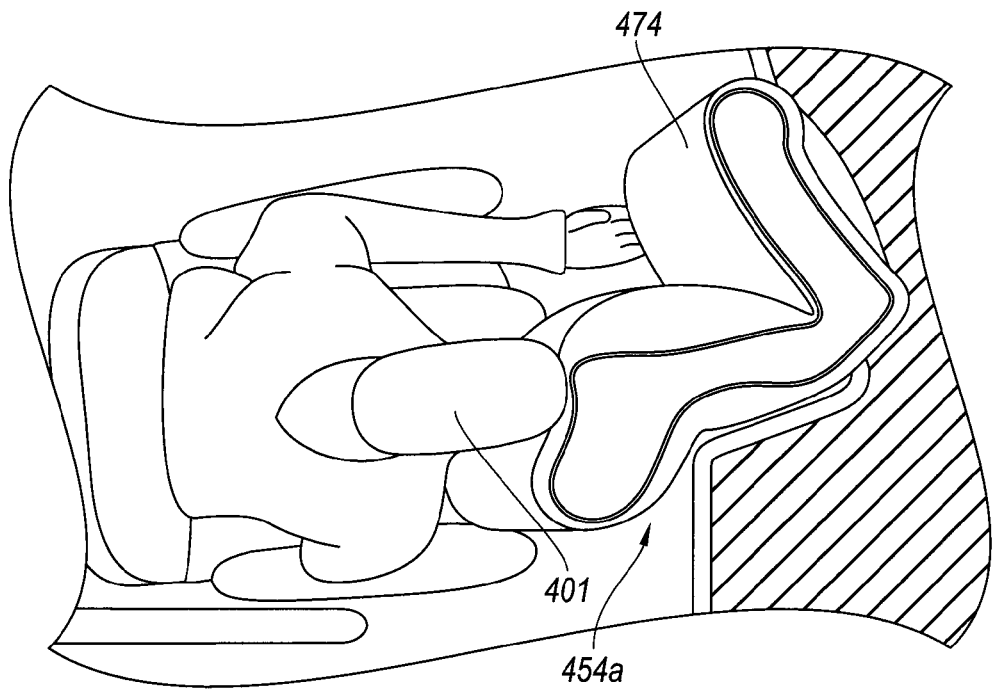
FIGS. 4A-4C are a series of views illustrating various structure mounted airbags configured in accordance with embodiments of the disclosure.
Figure 4B:
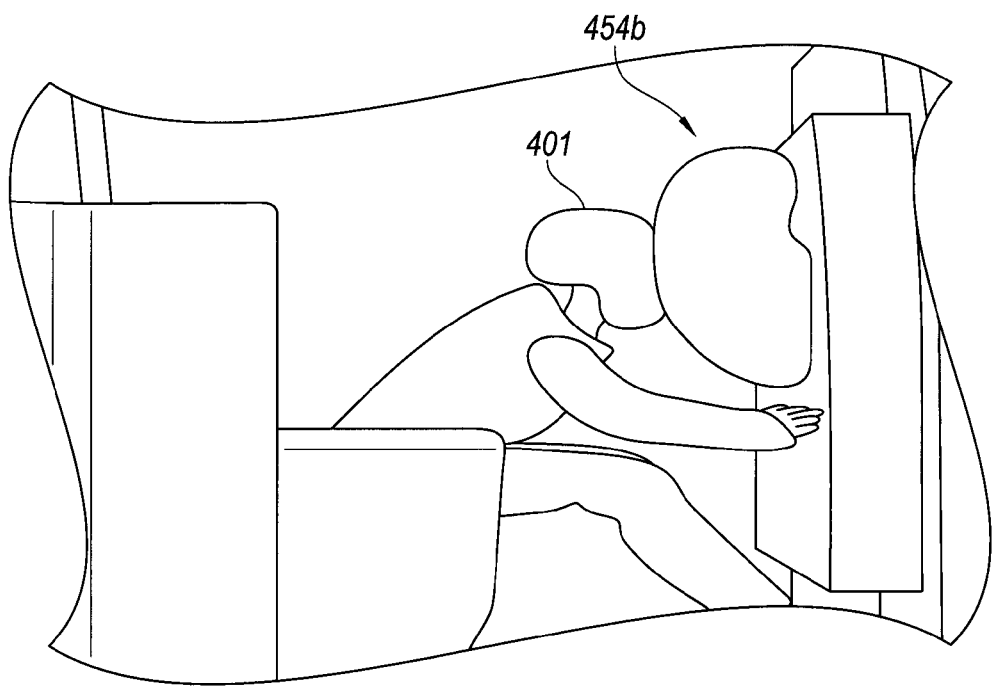
Figure 4C:
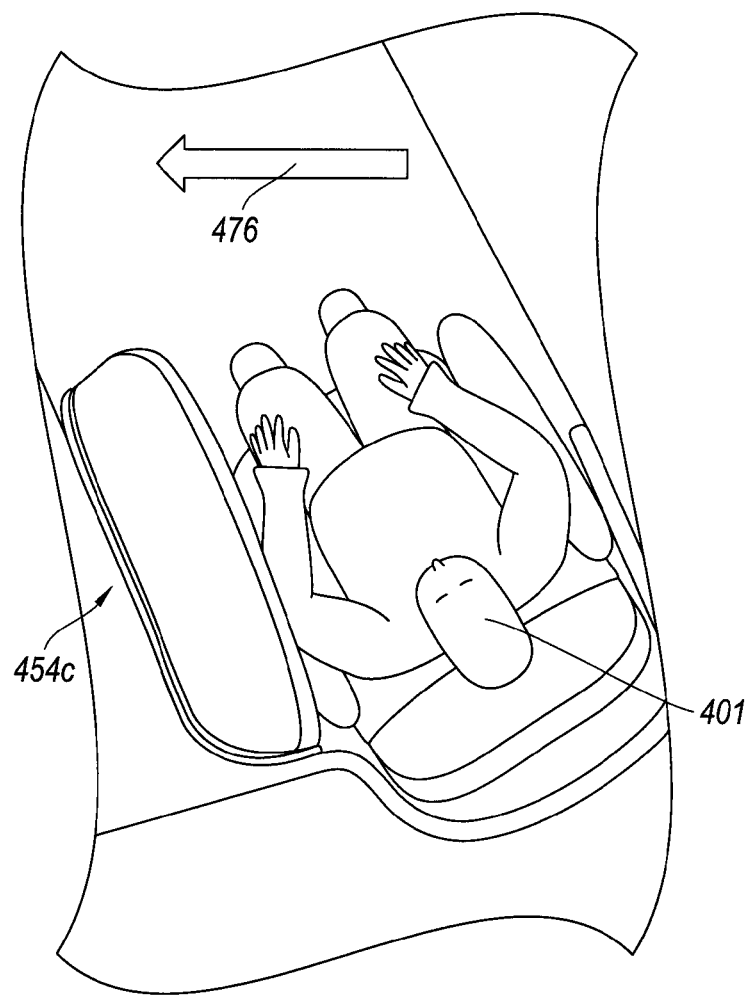

FIGS. 4A-4C are a series of views illustrating various airbags 454a-c for use with structure mounted airbag assemblies configured in accordance with embodiments of the disclosure. In FIG. 4A, airbag 454a can include a lateral portion 474 that projects from the main body portion of the airbag 454a. The airbag 454a, therefore, has a complex shape that at least generally conforms to the complex shape of the structure or monument forward of the seat occupant 401 to provide a suitable barrier there between. Similar to the airbags described above, the airbag 454a shown in FIG. 4A is configured to avoid contact with seat occupants that are in the brace position and out-of-position occupants (e.g., lap-held children). In other embodiments, the airbag 454a can have other suitable complex shapes that conform to the shape of monuments positioned forward of an aircraft seat.

As shown in FIG. 4B, in further embodiments, the airbag 454b can be mounted to a structure (e.g., a dividing wall) substantially or directly in front of the seat occupant 401. In the illustrated embodiment, the airbag 454b has a generally hemispherical cross-sectional shape, but in other embodiments the airbag 454b may have a generally triangular cross-sectional shape to absorb upper body impact before the seat occupant's head hits the airbag and/or other suitable airbag shapes.

In still further embodiments, the airbag 454c can be mounted to a permanent or semi-permanent structure proximate to the seat and in line with the vehicle direction. As shown in FIG. 4C, for example the airbag 454c can be positioned to the side of the aircraft seat (e.g., on a divider wall between aircraft seats) and generally in line with the aircraft direction (i.e., as indicated by arrow 476). In additional embodiments, the structure mounted airbag systems and assemblies disclosed herein can be mounted to other suitable structures and/or have other suitable configurations.

From the foregoing, it will be appreciated that specific embodiments have been described herein for purposes of illustration, but that modifications may be made without deviating from the spirit and scope of the various embodiments of the disclosure. The airbag system 100 illustrated in FIGS. 1-2D can include, for example, additional airbags assemblies 228 and/or inflators 230 operably coupled to the electronics module assembly 232 for use with the additional vehicle seats (e.g., within the same row as the seat 102). In various other embodiments, the housing 120 may be omitted and the airbag assembly 228 can be mounted directly to a portion of the aircraft (e.g., within the wall of the aircraft). Specific elements of any of the foregoing embodiments can also be combined or substituted for elements in other embodiments. Moreover, the restraint system described above can be incorporated in non-automobile or non-aircraft systems. Certain aspects of the disclosure are accordingly not limited to automobile or aircraft systems. Furthermore, while advantages associated with certain embodiments of the disclosure have been described in the context of these embodiments, other embodiments may also exhibit such advantages, and not all embodiments need necessarily exhibit such advantages to fall within the scope of the technology. Accordingly, the disclosure is not limited except as by the appended claims.

We claim:

1. An airbag system for use with an aircraft seat, the airbag system comprising:
    a housing having a cavity and an opening in communication with the cavity; and
    an airbag assembly positioned within the cavity, wherein the airbag assembly comprises—
        an airbag configured to deploy through the opening toward the aircraft seat to protect an occupant in the aircraft seat during a crash event, and
        a mounting structure including at least one mounting plate within the airbag and configured to attach the airbag assembly to the housing;
    an inflator spaced apart from the airbag; and
    a gas delivery hose extending from the inflator to the airbag, wherein the gas delivery hose is configured to provide a fluid passageway from the inflator to the airbag.

2. The airbag system of claim 1 wherein the mounting plate is an interior mounting plate, and wherein the airbag assembly further includes an exterior mounting plate attached to the interior mounting plate and configured to attach the airbag assembly across the opening of the housing.

3. The airbag system of claim 1, further comprising a door removably covering the opening, the door being configured to move away from the opening during airbag deployment.

4. An airbag assembly for a seat in an aircraft, the airbag assembly comprising:
    an airbag; and
    a mounting structure comprising an internal mounting plate positioned within the airbag and an external mounting plate positioned outside of the airbag and attached to the internal mounting plate, wherein a peripheral portion of the external mounting plate is configured to fixedly attach to a portion of the aircraft.

5. The airbag assembly of claim 4, further comprising a monument having a plurality of sidewalls that form a cavity, at least one of the sidewalls having an opening, wherein the airbag and the mounting structure are positioned in the cavity and generally aligned with the opening.

6. An airbag system configured for use with an aircraft seat, the airbag system comprising:
    a monument configured to be positioned forward of the aircraft seat, wherein the monument includes a covered opening; and
    an airbag assembly comprising a mounting structure and an airbag, wherein the mounting structure comprises an external mounting plate configured to be secured to the monument and
    an internal mounting plate positioned within the airbag and attached to the external mounting plate, wherein
        a peripheral portion of the external mounting plate is configured to fixedly attach to the monument within the aircraft, and
        the airbag is configured to deploy through the opening in the monument during a crash event.

* * * * *